United States Patent
Carlson et al.

(10) Patent No.: US 11,144,214 B2
(45) Date of Patent: Oct. 12, 2021

(54) MEMORY AUTHENTICATION

(71) Applicant: Micron Technology, Inc., Boise, ID (US)

(72) Inventors: Rachael R. Carlson, Meridian, ID (US); Aparna U. Limaye, Boise, ID (US); Diana C. Majerus, Boise, ID (US); Debra M. Bell, Boise, ID (US); Shea M. Morrison, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 222 days.

(21) Appl. No.: 16/522,454

(22) Filed: Jul. 25, 2019

(65) Prior Publication Data

US 2021/0026542 A1 Jan. 28, 2021

(51) Int. Cl.
| | |
|---|---|
| G06F 3/06 | (2006.01) |
| G06F 21/79 | (2013.01) |
| G11C 29/44 | (2006.01) |
| G06F 21/44 | (2013.01) |
| H04L 9/08 | (2006.01) |

(52) U.S. Cl.
CPC .......... *G06F 3/0622* (2013.01); *G06F 3/0637* (2013.01); *G06F 3/0688* (2013.01); *G06F 21/44* (2013.01); *G06F 21/79* (2013.01); *G11C 29/44* (2013.01); *H04L 9/0866* (2013.01)

(58) Field of Classification Search
CPC ........ G06F 3/0622; G06F 21/44; G06F 21/79; G06F 3/0637; G06F 3/0688; G11C 29/44; H04L 9/0866

USPC .......................................................... 726/27
See application file for complete search history.

(56) References Cited

U.S. PATENT DOCUMENTS

| | | | |
|---|---|---|---|
| 6,636,450 B2 | 10/2003 | Blodgett | |
| 6,876,586 B1 | 4/2005 | Hausmann | |
| 7,093,171 B2 | 8/2006 | Hsu et al. | |
| 7,415,641 B1* | 8/2008 | Behera | G11C 29/16 |
| | | | 365/201 |
| 9,286,161 B2 | 3/2016 | Pawlowski | |
| 10,217,525 B2 | 2/2019 | Yoko | |
| 2007/0104000 A1* | 5/2007 | Lin | G11C 29/72 |
| | | | 365/200 |

(Continued)

OTHER PUBLICATIONS

Pan et al., "A lightweight network repair scheme for data collection applications in zigbee WSNs", IEEE, doi: 10.1109/LCOM.2009. 5282363, 2009, pp. 649-651. (Year: 2009).*

(Continued)

*Primary Examiner* — Peter C Shaw
(74) *Attorney, Agent, or Firm* — Brooks, Cameron & Huebsch, PLLC

(57) ABSTRACT

Apparatuses and methods related to memory authentication. Memory devices can be authenticated utilizing authentication codes. An authentication code can be generated based on information stored in a fuse array of the memory device. The authentication code can be stored in the memory device. The stored authentication code can be compared to a captured authentication code based on fuse array information broadcast to memory components of the memory device. The authenticity of the memory device can be determined based on the comparison and can result in placing the memory device in an unlocked state.

21 Claims, 5 Drawing Sheets

(56) References Cited

U.S. PATENT DOCUMENTS

| | | | |
|---|---|---|---|
| 2008/0229154 A1* | 9/2008 | Esteves | G11C 29/816 714/42 |
| 2013/0083612 A1 | 4/2013 | Son et al. | |
| 2014/0082453 A1* | 3/2014 | Sikdar | G11C 29/44 714/763 |
| 2015/0135038 A1 | 5/2015 | Wilson et al. | |
| 2017/0185499 A1 | 6/2017 | Lee et al. | |

OTHER PUBLICATIONS

Farr et al., "Easily Repairable networks", arXiv, 1405.2185v1,2014, pp. 1-5. (Year: 2014).*

* cited by examiner

MEMORY AUTHENTICATION

TECHNICAL FIELD

The present disclosure relates generally to memory, and more particularly to apparatuses and methods associated with memory authentication.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1A:
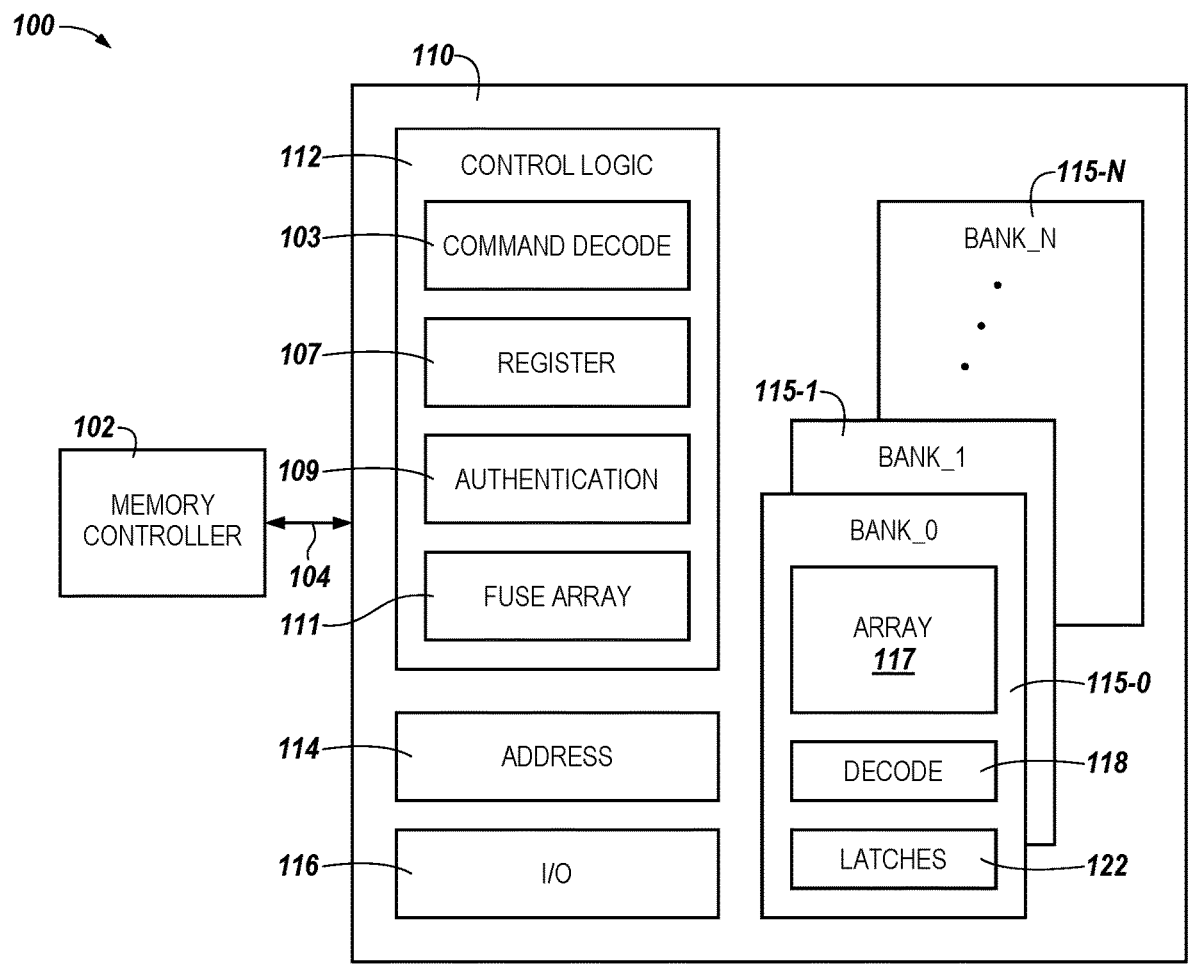
FIG. 1A is a block diagram of an apparatus in the form of a portion of a computing system including a memory device in accordance with a number of embodiments of the present disclosure.

The present disclosure includes apparatuses and methods related to memory authentication, which may improve security and quality assurance. By way of example, various computing systems include a number of processing resources that are coupled to memory (e.g., a memory system), which is accessed in association with executing a set of instructions (e.g., a program, applications, etc.). Various security concerns surround memory systems. For example, hackers may try to gain access to a memory system in order to obtain sensitive data, alter stored data, cause damage, etc. Security features are often employed by computing systems and/or by memory systems thereof to protect against unauthorized access, for example. Different security features may be employed by different memory systems, and different memory manufacturers may provide different levels of security. For this reason, among others, it can be beneficial to confirm the authenticity of a memory system and/or its constituent memory devices (e.g., DRAM dies).

For example, confirming that memory devices (e.g., DRAM dice) are from a particular manufacturer can provide a level of assurance that the devices have not been replaced with devices from a different manufacturer, which may pose a security threat. Additionally, since memory devices from different manufacturers may employ different security features and may have different quality levels, a customer (e.g., an entity purchasing a memory system from a manufacturer/vendor) may want to ensure the memory devices employed in the memory system are indeed authentic (e.g., from a known/particular manufacturer).

In various instances, it can be beneficial to maintain a memory device in an inaccessible (e.g., locked) state until and/or unless the memory device has been authenticated. As used herein, a locked state refers to a state in which a memory array of a memory device cannot be accessed. For example, data may not be written to and/or read from a "locked" (e.g., non-authenticated) memory device.

As described further herein, a number of embodiments of the present disclosure provide for memory device authentication by performing an authentication code match comparison. For example, an authentication code can be stored in an internal register, such as a multi-purpose register (MPR), of a memory device. The authentication code can serve as a hardware token. In various embodiments, the stored authentication code can be based on information specific to a particular memory device such that it can be used to uniquely identify the memory device. For example, the stored authentication code can be based on information stored in a fuse array of the memory device. A fuse array can be used to store information such as row and column addresses associated with remapping defective rows and columns of a memory array, as well as memory device option information for configuration and/or circuit trimming, for example. In various instances, control logic of a memory device can broadcast fuse data from the fuse array to constituent memory components (e.g., banks) of the memory device. The broadcast may occur at an initial power-up event of the memory device or at each power-up event, and the broadcasted information can be captured (e.g., latched) by the memory components.

In a number of embodiments of the present disclosure, an authentication component of a memory device can be used to capture the fuse array information being broadcast to the constituent memory components. The authentication component can determine an authentication code based on the captured fuse information and can then compare the determined authentication code with the stored authentication code to determine whether a match occurs. In various embodiments, a number of events can occur based on whether the compared authentication codes match. For instance, a determined mismatch of the authentication codes (e.g., an authentication failure) can result in the memory device remaining in a locked state. A determined match of the authentication codes (an authentication pass) can result in the memory device being unlocked. In a number of embodiments, a failed authentication attempt can be communicated to a host (e.g., processor) to which the memory device is coupled so that remedial action can be taken, if warranted.

The fuse array information on which the authentication code is based can be a selected portion of the fuse information. For instance, in a number of embodiments, only column fuse information is used to generate the authentication code. Also, selected portions of the column fuse information may be used to generate the authentication code. In various embodiments, the fuse array information used to generate the authentication code can be encoded such that the authentication code is an encoded version of the raw fuse array information. As such, while the authentication code is based on the fuse array information, it may or may not itself comprise fuse array information (e.g., column fuse address data).

In various instances, the authentication techniques described herein can be used in conjunction with a number of other authentication and/or security techniques. For instance, an authentication code match as described herein may be one of a plurality of authentication techniques which together may be used to authenticate a memory device. Although various examples described herein relate to a memory device, the authentication methods described herein are not so limited. For example, the various authentication techniques may apply to other hardware components such as processors, controllers, network devices, buses, and/or other components of a computing system.

FIG. 1A is a block diagram of an apparatus in the form of a portion of a computing system including a memory device 110 in accordance with a number of embodiments of the present disclosure. In this example, the apparatus is a memory system 100 comprising a memory controller 102 and the memory device 110. As used herein, a memory device 110, a memory bank 115, and/or memory controller 102, for example, might also be separately considered an "apparatus."

In this example, memory system 100 includes a memory controller 102 coupled to a memory device 110 via an interface 104. The memory system 100 can, for example, perform at least read operations and write operations in response to access requests from a host (not shown), which may include a personal laptop computer, a desktop computer, a digital camera, a mobile telephone, a memory card reader, or an Internet-of-Things (IoT) enabled device, among various other types of hosts. The host can access the memory system 100 in association with execution of an operating system (OS) and/or various applications.

The memory device 110 can be, for example, a DRAM device. Although a single memory device 110 is illustrated, embodiments are not so limited. For instance, the memory system 100 can include a plurality of memory devices 110 (e.g., DRAM dies) coupled to the memory controller 102 as part of a memory module such as a dual in-line memory module (DIMM). The memory controller 102 can access the one or more memory devices 110 via interface 104 responsive to host requests. As shown in this example, the memory device 110 includes address circuitry 114 to latch and decode address signals provided over the interface 104. The interface 104 can include, for example, a physical interface employing a suitable protocol (e.g., a data bus, an address bus, and a command bus, or a combined data/address/command bus). The memory device 110 includes input/output (I/O) circuitry 116 associated with transferring data to/from the memory device. The memory device 110 also includes control logic 112. The control logic 112 is configured to decode signals (e.g., commands) from the memory controller 102 (or host), such as chip enable signals, write enable signals, and address latch signals that are used to control operations performed on the memory components 115-0 (BANK_0), 115-1 (BANK_1), ... 115-N (BANK_N), which can be collectively referred to as memory components 115 or banks 115.

As shown in FIG. 1A, the memory components 115 include arrays 117 of memory cells, decode circuitry 118, and latches 122. The arrays 117 can be DRAM arrays, SRAM arrays, STT RAM arrays, PCRAM arrays, TRAM arrays, RRAM arrays, NAND flash arrays, and/or NOR flash arrays, for instance. The arrays 117 can comprise memory cells arranged in rows coupled by access lines (which may be referred to herein as word lines or select lines) and columns coupled by sense lines (which may be referred to herein as digit lines or data lines).

The decode circuitry 118 can include row and column decode circuitry configured to decode signals from the control logic 112 in association with accessing arrays 117. As described further below, the latches 122 of the memory banks 115 can latch signals received from the control logic 112. Such signals can include fuse information such as row address information, column address information, and/or configuration information broadcast to the respective banks 115.

In this example, the control logic 112 includes a command decoder 103, a register 107, authentication circuitry 109, and an array of programmable elements 111 (e.g., fuse array). The control logic 112 is responsible for executing commands from the memory controller 102. The control logic 112 can comprise a state machine, a sequencer, and/or some other type of control circuitry, which may be implemented in the form of hardware, firmware, or software, or any combination of the three. In some examples, the memory controller may reside on a host.

The command decoder 103 is configured to decode commands received from memory controller 102. The register 107 can be, for example, a "hidden" (e.g., reserved) multipurpose register (MPR), which can only be written to internally (e.g., it cannot be written to via a command external to the memory device 110). The register 107 may also have a limited external read permission such that a particular sequence is required in order to read the contents via a command from a source external to the memory device 110. For example, a manufacturer of the memory device 110 may know the particular sequence required to access the register 107; however, the manufacturer may prevent other entities (e.g., customers) from having external read permission of register 107 by not sharing the particular sequence with such entities. The register 107 can store an authentication code used determine the authenticity of the memory device 110. As described in more detail below, the authentication circuitry 109 is configured to perform an authentication operation that includes comparing the authentication code stored in register 107 to an authentication code based on information stored in the fuse array 111 and broadcasted to the memory components 115. Although the array of programmable elements 111 is described as a fuse array, embodiments are not so limited. For example, the array of programmable elements may include various types of non-volatile elements such as flash memory cells (e.g., NAND or NOR), phase change memory cells, etc. Additionally, as used herein, a fuse element is intended to include antifuse elements, and a fuse array 111 can include a number of fuses and/or a number of antifuses.

As indicated above, a fuse array such as fuse array 111 can be used to store various information that can be broadcasted to memory banks 115 in association with operating memory device 110. For example, fuse array 111 can include row fuses that can be used to remap defective rows (e.g., rows having defective memory cells) within banks 115 to redundant rows and column fuses that can be used to remap defective columns within banks 115. The fuse array can also include various option fuses that can store, for example, various configuration and/or trimming information. Some of the fuse information may be static, while other fuse information may be variable. For example, in various instances, row address fuse data may be alterable via a post package repair (PPR) operation. A PPR operation refers to an operation used to remap defective memory addresses to redundant addresses after packaging of a memory device (e.g., when the memory device may only be accessible via contacts/pins). However, in various instances, a PPR operation only affects the row fuse data such that the column address fuse data is unaffected by a PPR operation (e.g., the column fuse data remains static).

Figure 1B:
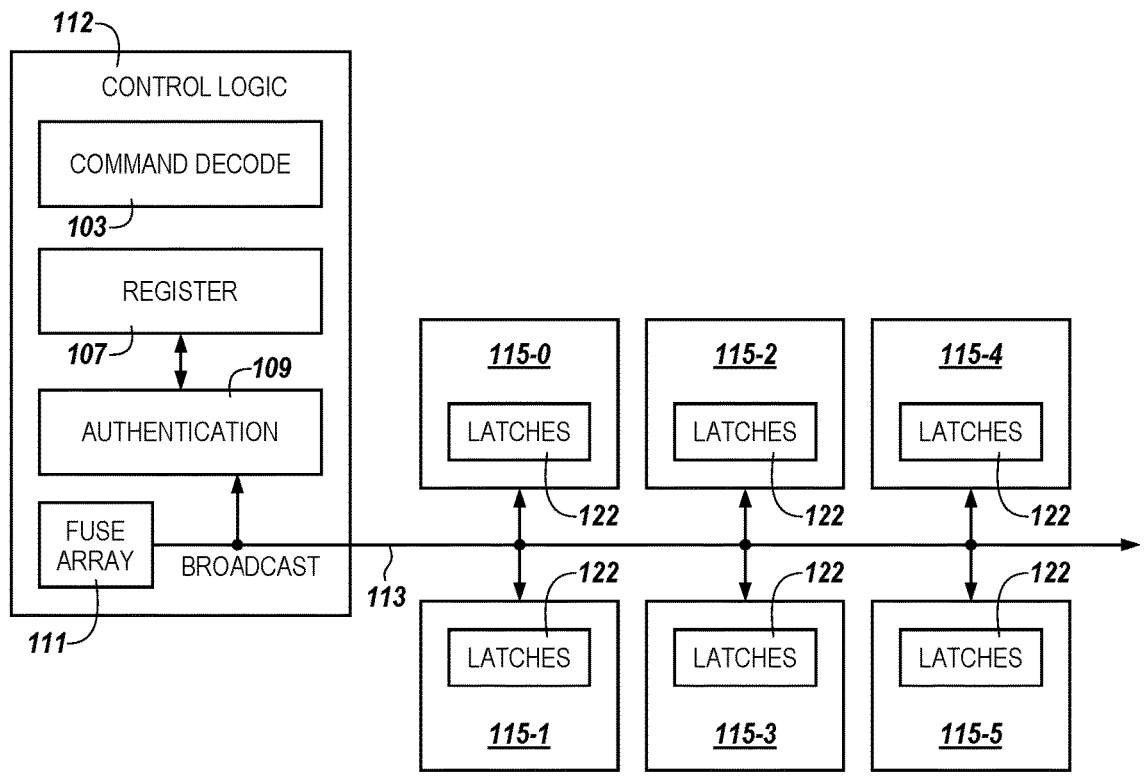
FIG. 1B is a block diagram of an apparatus in the form of a portion of a memory device in accordance with a number of embodiments of the present disclosure.

FIG. 1B illustrates a portion of the memory system 100 shown in FIG. 1A. FIG. 1B illustrates a bus (e.g., data bus) 113 over which information stored in fuse array 111 can be broadcast to memory components 115 of the memory device 110. For illustrative purposes, only six memory components (e.g., banks) 115-0, 115-1, 115-2, 115-3, 115-4, and 115-5 are shown in FIG. 1B.

In operation (e.g., during power-up), a fuse array broadcast can occur in which information stored in fuse array 111 is sent to various components of the memory device 110 (e.g., memory banks 115). Each memory component 115 is configured to decode the signals provided in the broadcast (e.g., via decode circuitry 118) to determine the type of signal (e.g., row fuse signal, column fuse signal, option fuse signal, etc.) and latch (via latches 122) the signals locally. As noted above, the fuse array information can be unique to a memory device, which can allow the information (or a portion thereof) to be used to authenticate the memory device. In a number of embodiments of the present disclosure, the authentication circuitry 109 can capture (e.g., via latches not shown in FIG. 1B) the fuse array information as it is broadcasted to the memory components 115. The authentication circuitry 109 can then compare the captured fuse information to the authentication code previously stored in register 107. A match indicates the memory device is authentic, while a mismatch indicates the memory device is not authentic.

The authentication code stored in register 107 is also based on the information stored in fuse array. Although, as noted above and as described further herein, the fuse information stored in register 107 may be encoded. Accordingly, in instances in which the authentication code stored in register 107 is an encoded version of the fuse array information, the authentication circuitry 109 can be configured to compare an encoded version of the broadcast fuse information to the authentication code stored in register 107. For example, the fuse information broadcast via bus 113 can be encoded (via an encoder such as encoder 308 shown in FIG. 3) prior to being compared to the authentication code stored in register 107.

In a number of embodiments, the authentication code can be stored in the register 107 prior to providing the memory device 110 to a customer (e.g., from a manufacturer). For instance, a manufacturer of the memory device 110 may program the authentication code to the register 107. In this manner, a customer can have some assurance/confidence that the memory device is authentic responsive to a determined authentication code match determination by the authentication circuitry 109. A mismatch determined by the authentication circuitry 109 can indicate to the customer that the memory device 110 is not authentic (e.g., that the memory device 110 is from a different manufacturer or that the security of the memory device has been compromised via hacker for instance).

In a number of embodiments, the memory device 110 may be in a locked state until authentication occurs. Also, the authentication operation may occur at each power-up of the memory device 110. Therefore, a user of the memory device 110 can be assured that the memory device 110 has not been replaced with an inauthentic memory device between power-up events.

As noted above, in various embodiments, a memory system 100 can include, for example, a memory module comprising a plurality of memory devices 110 (e.g., DRAM die). As described further in association with FIG. 5, a controller (e.g., memory controller 102) can be configured to initiate a memory device to memory device authentication procedure (e.g., at power-up of the system). The authentication procedure can involve, on a device to device basis (e.g., in a daisy chain manner) sending an authentication request from a first memory device to a next memory device. If the first memory device receives a verified response from the next memory device (e.g., the memory device to which the first memory device sent the request), the first memory device can store an authentication status indicating that the next memory device is authentic. In contrast, if the first memory device receives a non-verified response or no response to the authentication request from the next memory device, the first memory device can store an authentication status indicating that the next memory device is not authentic.

The device to device authentication procedure can continue for the remaining memory devices with each memory device providing an authentication request to the next memory device. The memory device that provides the authentication request can store an indication of an authentication status of the memory device to which the authentication request is provided, with the authentication status being based on whether or not the memory device that provides the authentication request receives a verified response from the memory device to which the authentication request is provided. The controller (e.g., 102) can then determine an authentication status of the plurality of memory devices (e.g., the memory module) based on the respective authentication statuses stored in the plurality of memory devices.

Figure 2:
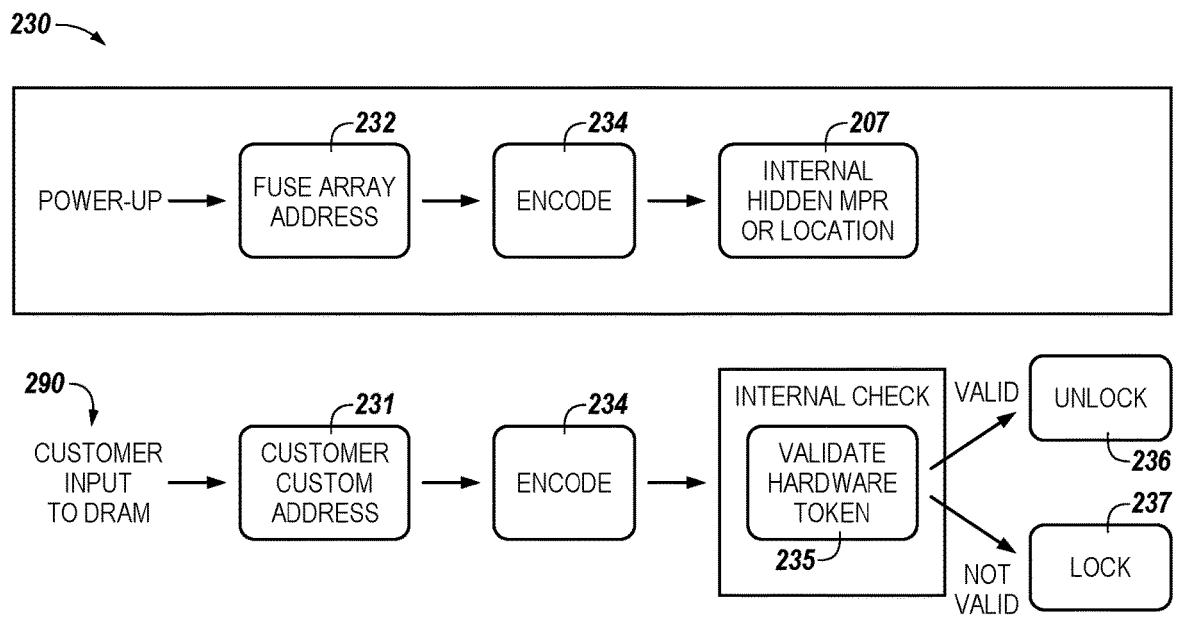
FIG. 2 illustrates a number of example flow sequences associated with implementing memory authentication in accordance with a number of embodiments of the present disclosure.
Figure 3:
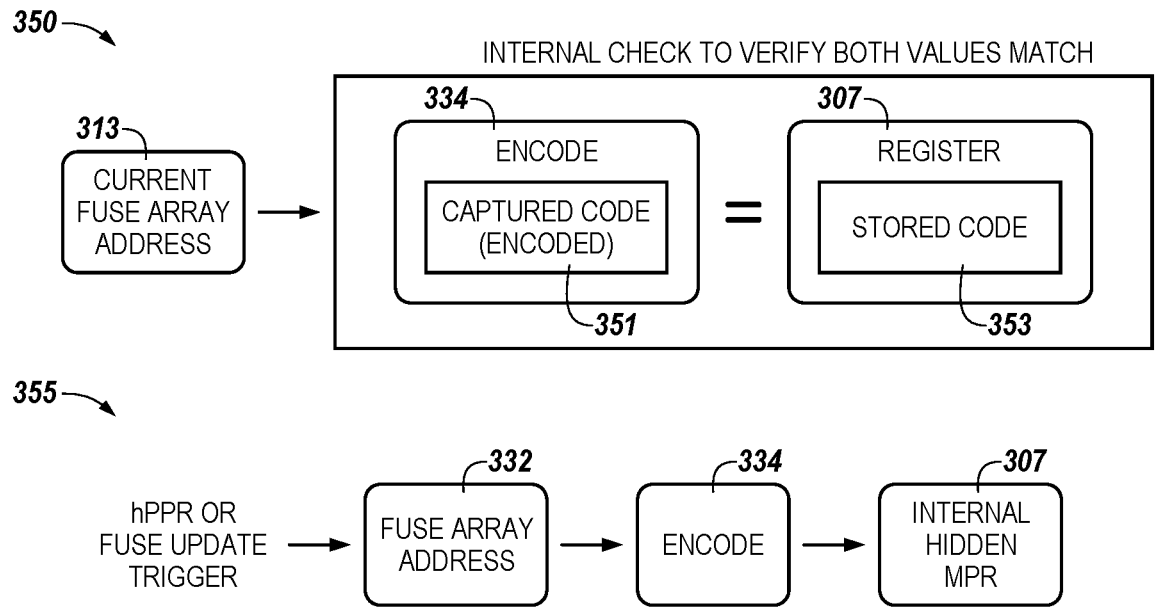
FIG. 3 illustrates a number of example flow sequences associated with implementing memory authentication in accordance with a number of embodiments of the present disclosure.
Figure 4:
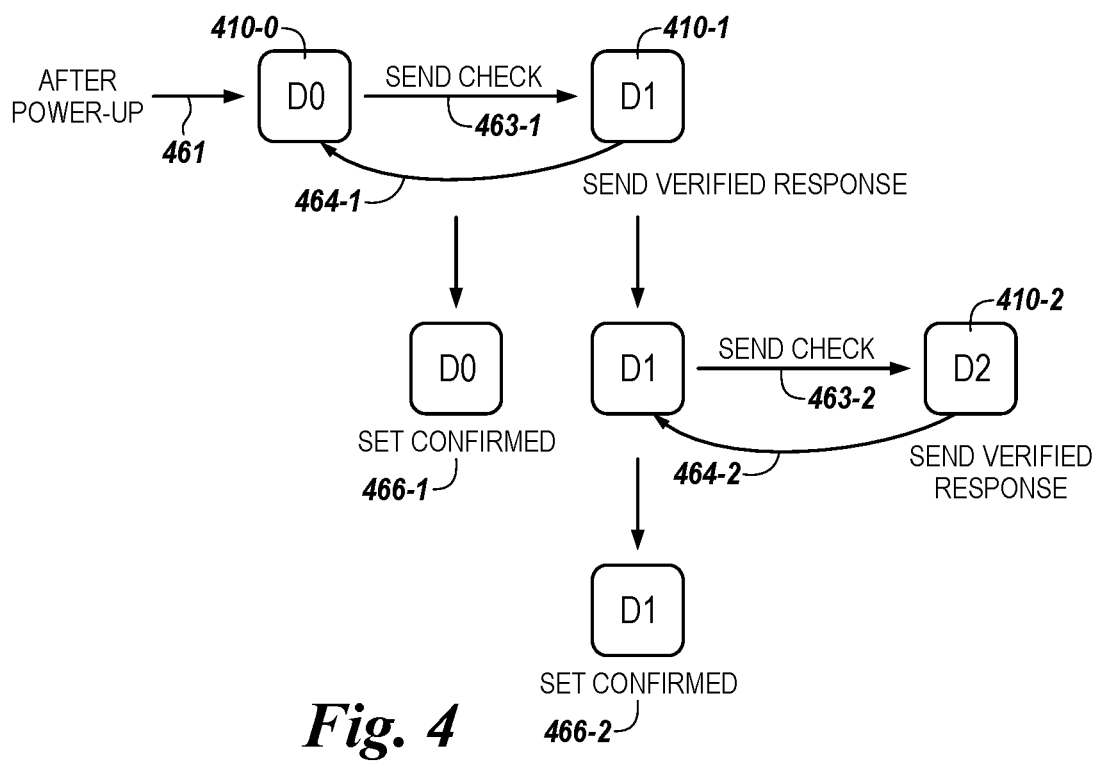
FIG. 4 is a block diagram illustrating authentication of memory devices in accordance with a number of embodiments of the present disclosure.
Figure 5:
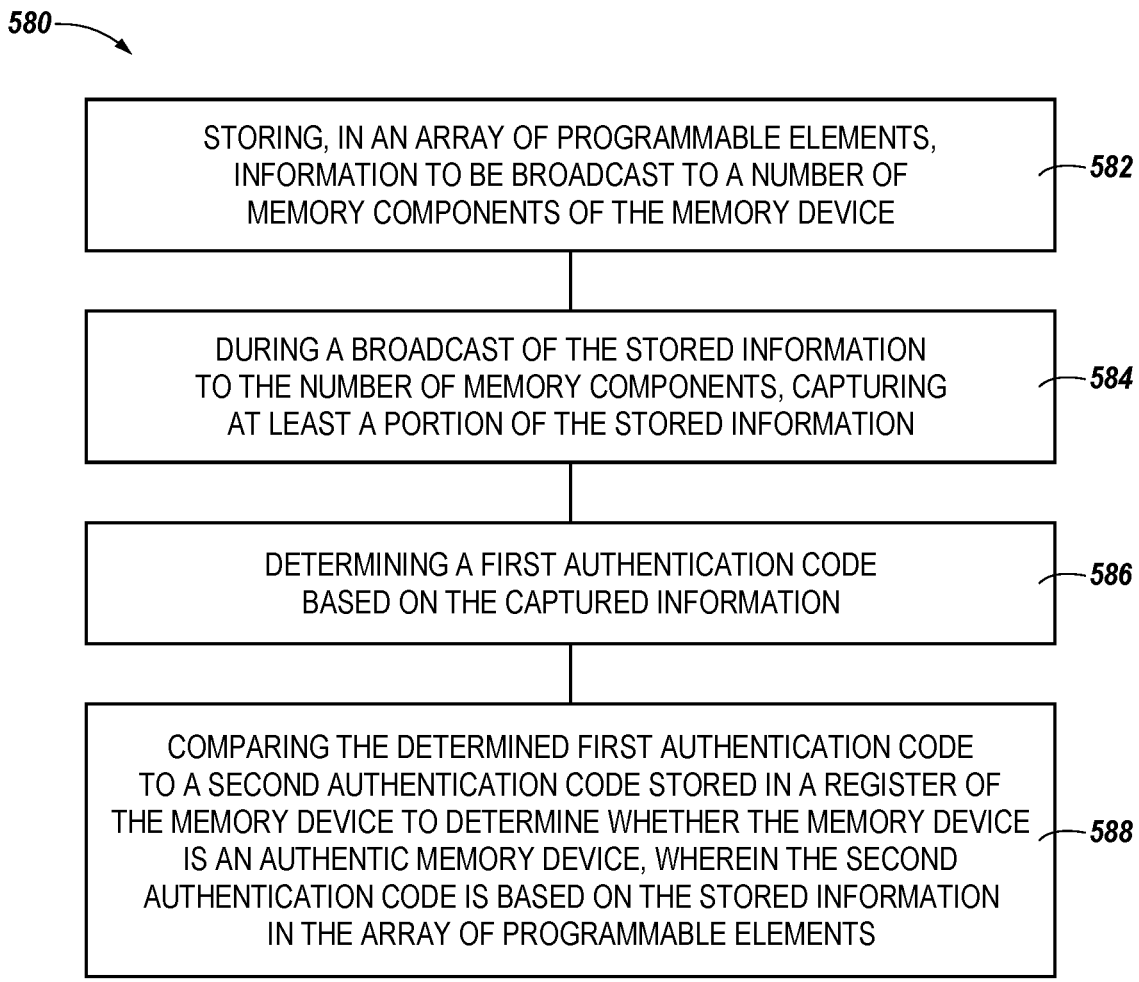
FIG. 5 illustrates an example method for memory authentication in accordance with a number of embodiments of the present disclosure.

In a number of embodiments, the device to device authentication method described in association with FIG. 5 can be employed separate from, or in addition to, the authentication methods described in association with FIGS. 2-4. Various embodiments of the present disclosure can provide authentication of memory devices without intervention from a host (e.g., host central processing unit). For example, the authenticity of the memory devices 110 can be determined without requiring execution of a host command.

FIG. 2 illustrates a number of example flow sequences associated with implementing memory authentication in accordance with a number of embodiments of the present disclosure. Sequence 230 illustrates an example of storing an authentication code in a memory device (e.g., 110) in association with placing the memory device in a locked state. The example sequence 230 can be initiated by the memory device manufacturer prior to providing the memory device to a customer, for instance. In this example, the authentication code comprises encoded fuse array address information that is stored in an internal register 207 of the memory device. The register 207 can be a hidden register such as register 107 described in association with FIGS. 1A and 1B. Accordingly, register 207 may have limited external read permission and may only be written to internally.

Example sequence 230 can be initiated upon a power up of the memory device. Upon power up, fuse array information can be captured (e.g., during a broadcast to memory banks of the device) by authentication circuitry of the memory device (e.g., authentication circuitry 109). In this example, the fuse array information comprises fuse array address information 232. As noted above, the fuse array address information can include, but is not limited to, option fuse data, row fuse data, and/or column fuse data. In a number of embodiments, the captured fuse array address information may be limited to static information such as column fuse address information which may not change due to operations such as PPR operations. As noted above, the captured fuse array information can be a selected portion of the stored fuse array information and can serve as a unique identifier for the memory device since the fuse array information likely varies from device to device. For example, defective row/column remapping fuse information is unlikely to be the same for different memory devices.

As an example, the fuse array address information to be captured might comprise a bit pattern corresponding to a particular plurality of respective column fuses (e.g., 8 bits, 16 bits, 2K bits, etc.). For instance, 8 particular column fuses of a first memory device might correspond to a bit pattern "00001010", while the 8 particular column fuses of second memory device might correspond to a bit pattern of "00101000".

As shown in sequence 230, the captured fuse array information 232 can be encoded via an encoder 234. The encoder 234 can comprise a linear feedback shift register (LFSR), for example; however, embodiments are not limited to a particular type of encoder. The encoded captured fuse array information can serve as an authentication code (e.g., hardware key) for the memory device. In various embodiments, the captured fuse array information may itself serve as the authentication code. However, encoding the captured fuse array information can provide an added level of security to prevent a potential security threat (e.g., hacker) from realizing that the authentication code is being generated from fuse array information.

The authentication code (e.g., encoded captured fuse array information) can be stored in the hidden register 207. In a number of embodiments, subsequent to storing of the authentication code in the register 207, the memory device is in a locked state in which it is inaccessible (e.g., the memory banks cannot be written to and/or read from). The memory device can be unlocked (e.g., placed in an accessible state) by being authenticated. For example, a memory device can be authenticated by providing a matching authentication code to the memory device which can be compared against the authentication code stored in the register 207.

For instance, sequence 290 illustrates an authentication attempt on a locked memory device. In this example, the authentication attempt is by a customer. As an example, the customer may provide an authentication code (shown as "Customer Custom Address") 231 to the memory device. The custom address 231 can be encoded via the encoder 234, and the memory device can perform a validation procedure at 235 by comparing the encoded custom address to the stored authentication code (e.g., the code stored in register 207). Responsive to a determined match, authentication is confirmed ("Valid") and the memory device can be placed in the unlocked state as shown at 236. Responsive to a determined mismatch, authentication fails and the memory device remains in the locked state as shown at 237. In order to unlock the memory device, the customer can obtain the authentication code from the entity that locked the memory device (e.g., the manufacturer). Obtaining the customer custom address 231 from the manufacturer can ensure that the memory device which is being unlocked is the memory device which was provided by the manufacturer.

FIG. 3 illustrates a number of example flow sequences associated with implementing memory authentication in accordance with a number of embodiments of the present disclosure. Sequence 350 illustrates an example authentication code validation, and sequence 355 illustrates an example for updating an authentication code.

In sequence 350, current fuse array information (e.g., a current fuse array address) is evaluated to determine whether the memory device is an authentic memory device. As describe above, the authentication code to which a stored authentication code is compared is based on the fuse array information captured by authentication circuitry (e.g., 109) during the authentication process. In this example, the captured current fuse array information 313 is encoded via an encoder 334 to yield the authentication code 351 which is to be compared to the previously stored authentication code 353, which is stored in register 307 (e.g., a hidden/reserved internal register as described herein).

Control logic internal to the memory device (e.g., control logic 112) can be configured to (via authentication circuitry 109) capture the current fuse array information 313 during a broadcast of the information to components (e.g., banks) of the memory device. Comparison of the captured code 351 to the stored code 353 can determine whether the memory device is (or is not) authentic.

Sequence 355 illustrates a process for updating (e.g., changing) the authentication code that is stored in the internal hidden register 307. In various instances, fuse array information may be updated/changed based on, for example, device configuration changes, changes to remapping information stored in the fuse array, etc. Therefore, in instances in which the authentication code is based on the stored fuse array information, it can be beneficial to update the stored authentication code responsive to changes to the fuse array information.

In the present example, the fuse array information is adjusted due to a hard post package repair (hPPR) operation. The hPPR operation can result in changes to the fuse array address 332 on which the captured and stored authentication codes are based. In this example, the updated fuse array address 332 can be encoded via encoder 334 and then the updated authentication code can replace the previous authentication code stored in the hidden register 307. Subsequent authentication processes can then involve comparing the updated stored authentication code to the captured authentication code.

FIG. 4 is a block diagram illustrating authentication of memory devices in accordance with a number of embodiments of the present disclosure. The example shown in FIG. 4 includes three memory devices 410-0 (D0), 410-1 (D1), and 410-2 (D2), which can be referred to collectively as memory devices 410. The memory devices 410 can be, for example, DRAM dies within a DRAM module such as a DIMM.

The example shown in FIG. 4 can be referred to as a self-authentication scheme since the memory devices are performing an authentication process without intervention from an external source such as a host. As described below, the memory devices can communicate with each other to determine whether the respective memory devices are authentic (e.g., from a known/trusted source). In embodiments in which the memory devices 410 are part of a module, the module may be considered to be trusted responsive to a successful authentication of all of the memory devices. An indication of those memory devices not successfully authenticated can be reported to an external source such as a memory controller and/or host.

In FIG. 4, the authentication process is initiated at 461. Initiation can be at power up of the memory devices 410, or by a command provided from a memory controller (e.g., memory controller 102), for example. As shown in FIG. 4, responsive to initiation of the authentication process, a first of the memory devices 410-0 can provide an authentication request 463-1 to a second of the memory devices 410-1. Responsive to receiving the request 463-1, the memory device 410-1 can send a verified response 464-1 to the memory device 410-0. As used herein, a verified response refers to a particular response that the sending memory device expects to receive in response an authentication request it sends. A verified response can include, for example, an acknowledgement that the request 463 was received, or a particular code (e.g., key). If the memory device 410-0 does not receive a verified response from the memory device 410-1 responsive to the sent request 463-1, the memory device 410-0 can store an authentication status indicating that the memory device 410-1 is not authentic. If the memory device 410-0 receives a verified response 464-1, then it can store an indication 466-1 ("Set Confirmed") that the memory device 410-1 is authentic. For example, a flag can be set to indicate D0 is confirmed as having passed authentication.

The authentication process described above can be repeated (e.g., in a daisy chain manner) for the remaining memory devices of the plurality of memory devices (e.g., 410-1 and 410-2 in this example). For instance, in this example, memory device 410-1 can send an authentication request 463-2 to a next memory device 410-2 and await a verified response 464-2. In this example, if memory device 410-1 receives a verified response 464-2 from memory device 410-2 responsive to the sent request 463-2, then the device 410-1 can store an indication 466-2 that memory device 410-2 passed authentication. If memory device 410-2 does not send a response to memory device 410-1 or sends a response that is not a verified response, then memory device 410-1 can store an indication that memory device 410-2 failed authentication.

In a number of embodiments, a memory controller such as memory controller 102 can be configured to determine an authentication status of the plurality of memory devices 410 based on the authentication statuses stored in the plurality of memory devices 410. The memory controller may be configured to report the authentication status of the memory devices 410 to a host such that remedial action can be taken as may be appropriate.

FIG. 5 illustrates an example method 580 for memory authentication in accordance with a number of embodiments of the present disclosure. At 582, the method includes storing, in an array of programmable elements, information to be broadcast to a number of memory components of a memory device. As described herein, the array of programmable elements can be a fuse array, the number of memory components can be memory banks, and the memory device can be a DRAM device, for example.

At 584 the method 580 includes, during a broadcast of the stored information to the number of memory components, capturing at least a portion of the stored information. The captured portion of the stored information can correspond to column fuse address information and may include only a selected portion of the column fuse address information. At 586 the method includes determining a first authentication code based on the captured information. The first authentication code can be the raw fuse data itself or it can be an encoded version or the fuse data, for example.

At 588 the method includes comparing the determined first authentication code to a second authentication code stored in a register of the memory device to determine whether the memory device is an authentic memory device. The second authentication code is based on the stored information in the array of programmable elements. The register can be an internal hidden register of the memory device that can only be written internally and may have limited external read access. The second authentication code may be stored in the register by a memory device manufacturer prior to providing the memory device to a customer. A determined match between the first and second authentication codes can be used to confirm/verify the authenticity of the memory device, while a determined mismatch can indicate inauthenticity of the memory device.

As described above, in a number of embodiments, a first authentication code stored in the internal hidden register can be compared to a second authentication code provided by a host during the authentication process. For instance, the first authentication code can be stored in the hidden register during a broadcast of fuse information, and the second authentication code can be obtained (e.g., from an entity that locked the memory devices, such as the manufacturer) and provided to the memory device via a host command, for example. Responsive to a determined mismatch of the first and second authentication codes, authentication fails, and the memory device remains in the locked state since the memory device is not authenticated.

Figure 6:
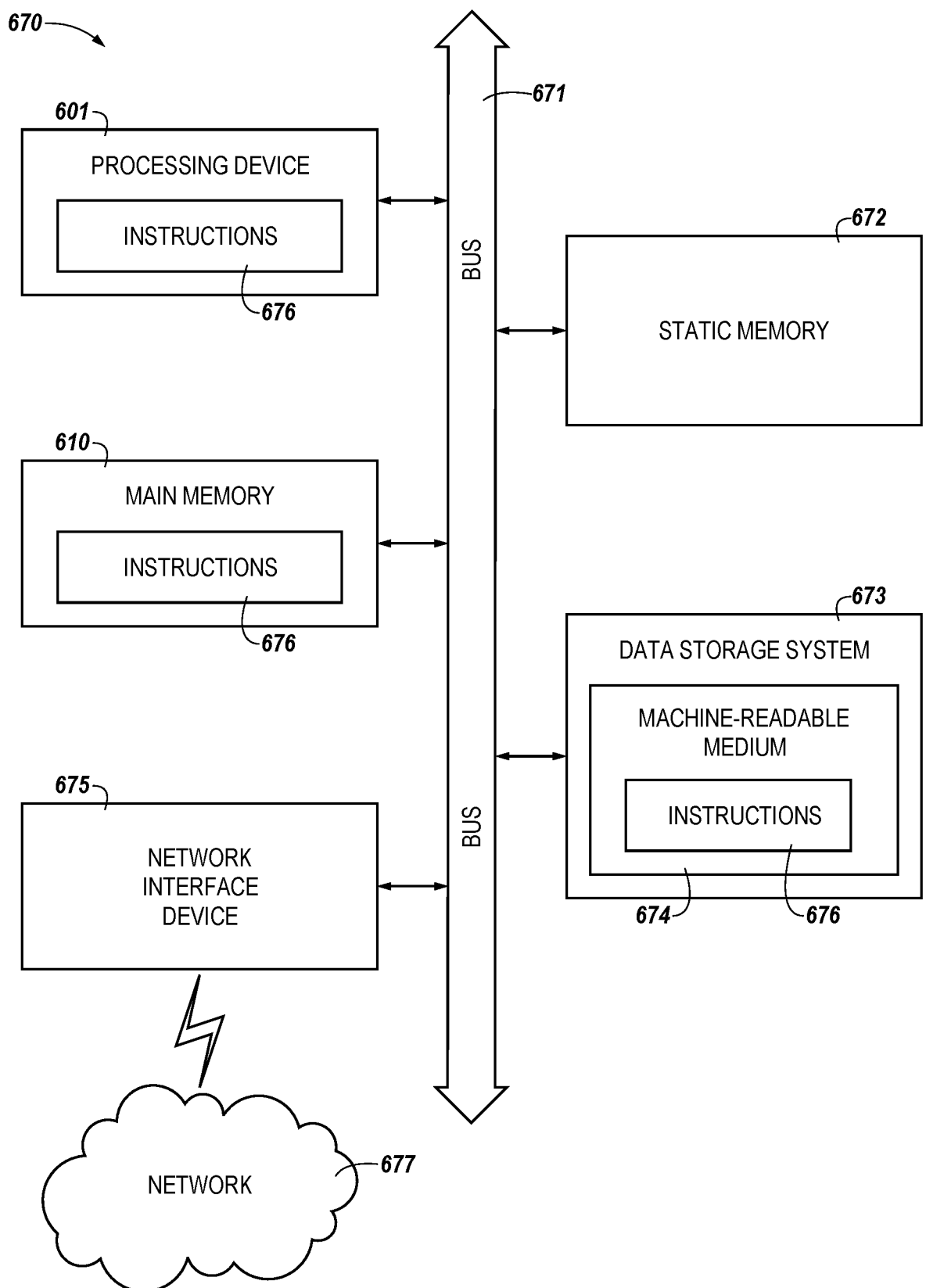
FIG. 6 illustrates an example computing system within which instructions, to perform various memory authentication methodologies discussed herein, can be executed.

FIG. 6 illustrates an example computing system 670 within which instructions, to perform various memory authentication methodologies discussed herein, can be executed. In various embodiments, the computing system 670 can correspond to a host system that includes, is coupled to, or utilizes a memory system (e.g., the memory system 100 of FIG. 1A). In alternative embodiments, the system 670 can be connected (e.g., networked) to other computing systems in a LAN, an intranet, an extranet, and/or the Internet. The computing system 670 can operate in the capacity of a server or a client machine in client-server network environment, as a peer machine in a peer-to-peer (or distributed) network environment, or as a server or a client machine in a cloud computing infrastructure or environment.

The computing system can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine The example computer system 670 includes a processing device 601, a main memory 610 (e.g., read-only memory (ROM), flash memory, dynamic random access memory (DRAM) such as synchronous DRAM (SDRAM) or Rambus DRAM (RDRAM), etc.), a static memory 672 (e.g., flash memory, static random access memory (SRAM), etc.), and a data storage system 673, which can communicate with each other via a bus 671.

Processing device 601 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 601 can also be one or more special-purpose processing devices such as an application specific integrated circuit (ASIC), a field programmable gate array (FPGA), a digital signal processor (DSP), network processor, or the like. The processing device 601 is configured to execute instructions 676 for performing the operations and steps discussed herein. The computing system 670 can further include a network interface device 675 to communicate over a network 677.

The data storage system 673 can include a machine-readable storage medium 674 (also known as a computer-readable medium) on which is stored one or more sets of instructions 676 or software embodying any one or more of the methodologies or functions described herein. The instructions 676 can also reside, completely or at least partially, within the main memory 610 and/or within the processing device 601 during execution thereof by the system 670, the main memory 610 and the processing device 601 also constituting machine-readable storage media.

In a number of embodiments, the instructions 676 include instructions to implement functionality corresponding to the controller 102 of FIG. 1A and/or the control logic 112 shown in FIG. 1B. While the machine-readable storage medium 674 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a number of memory components of a memory device;
   an array of programmable elements used to store information to be broadcast to the number of memory components, wherein the stored information comprises repair address information corresponding to defective addresses of the memory device; and
   control circuitry configured to:
      capture at least a portion of the stored information during a broadcast of the stored information to the number of memory components;
      determine a first authentication code based on the captured information; and
      determine whether the memory device is an authentic memory device based on comparing the determined first authentication code to a second authentication code stored in a register of the memory device.

2. The apparatus of claim 1, wherein the array of programmable elements comprises a fuse array storing fuse information in at least one of:
   a number of fuses; and
   a number of antifuses.

3. The apparatus of claim 2, wherein the fuse information comprises the repair address information corresponding to the defective addresses of the memory device.

4. The apparatus of claim 3, wherein the repair address information comprises column fuse data and row fuse data, and wherein the at least a portion of the stored information captured during the broadcast comprises only column fuse data.

5. The apparatus of claim 1, wherein the control circuitry is configured to determine the first authentication code based on the captured information by encoding the captured information prior to comparing the first authentication code to the second authentication code stored in the register of the memory device.

6. The apparatus of claim 5, further comprising a linear feedback shift register (LFSR) configured to encode the captured information.

7. The apparatus of claim 5, wherein the register of the memory device comprises a mode register that is not write accessible.

8. The apparatus of claim 1, wherein the number of memory components comprise a number of banks of memory cells.

9. The apparatus of claim 8, wherein the banks of memory cells comprise volatile memory cells, and wherein the array of programmable elements comprises non-volatile storage elements.

10. The apparatus of claim 1, wherein the control circuitry is configured to provide an indication that the memory device is not an authenticate memory device responsive to determining a mismatch between the first authentication code and the second authentication code.

11. The apparatus of claim 1, wherein the number of memory components comprise respective memory arrays, and wherein the control circuitry is configured to prevent access to the memory responsive to determining a mismatch between the first authentication code and the second authentication code.

12. A method for authenticating a memory device, comprising:
storing, in an array of programmable elements, information to be broadcast to a number of memory components of the memory device;
during a broadcast of the stored information to the number of memory components, capturing at least a portion of the stored information, wherein the stored information comprises repair address information corresponding to defective addresses of the memory device;
determining a first authentication code based on the captured information;
storing the first authentication code in a register of the memory device;
providing a second authentication code to the memory device;
comparing the first authentication code to the second authentication code, wherein the second authentication code is based on the stored information in the array of programmable elements; and
determining a characteristic of the memory device based at least in part on comparing the first authentication code to the second authentication code.

13. The method of claim 12, wherein:
the array of programmable elements comprises a fuse array storing:
column fuse data corresponding to defective column addresses associated with memory arrays of the number of memory components; and
row fuse data corresponding to defective row addresses associated with memory arrays of the number of memory components; and
capturing the at least a portion of stored information includes capturing column fuse data.

14. The method of claim 13, wherein:
the method includes storing the first authentication code in the register prior to providing the memory device to a customer;
the column fuse data is stored in the fuse array prior to providing the memory device to the customer;
the second authentication code is obtained by a provider of the memory device by reading the first authentication code from the register prior to providing the memory device to the customer; and
the method includes the customer receiving, from the provider of the memory device, the second authentication code to be provided to the memory device.

15. The method of claim 14, wherein the first authentication code comprises an encoded version of the column fuse data.

16. The method of claim 12, wherein determining the characteristic of the memory device comprises:
determining the memory device to be authenticated responsive to a determined match between the first authentication code and the second authentication code; and
determining the memory device to be inauthentic responsive to a determined mismatch between the first authentication code and the second authentication code.

17. The method of claim 12, wherein the memory device is a dynamic random access memory (DRAM) device, and wherein the method includes:
updating the information stored in the array of programmable elements responsive to a hard post package repair (hPPR) operation; and
wherein the at least a portion of the stored information captured during the broadcast is unaffected by the hPPR operation.

18. The method of claim 12, wherein the method includes:
performing the comparing of the determined first authentication code to the second authentication code stored in a register of the memory device responsive to each power up event of the memory device;
providing an indication of a failed authenticate attempt responsive to determining a mismatch between the first authentication code and the second authentication code; and
preventing access to memory arrays of the number of memory components responsive to determining the mismatch between the first authentication code and the second authentication code.

19. The method of claim 12, wherein the method includes updating the second authentication code responsive to a change to the information stored in the array of programmable elements that is to be broadcast to the number of memory components.

20. An apparatus, comprising:
a plurality of memory devices; and
a controller configured to initiate a memory device to memory device authentication procedure that comprises:
providing a first authentication request from a first memory device to a second memory device;
responsive to receiving, at the first memory device, a verified response to the first authentication request from the second memory device, storing, in the first memory device, an authentication status indicating that the second memory device is authentic; and
responsive to receiving, at the first memory device, a non-verified response or no response to the first authentication request from the second memory device, storing, in the first memory device, an authentication status indicating that the second memory device is not authentic, wherein the verified response and the non-verified response are based on a comparison of a first authentication code, determined from captured information, to a second authentication code stored in a register of the second memory device, and wherein the captured information comprises repair address information corresponding to defective addresses of the memory device and wherein the captured information was previously stored at and broadcasted from an array of programmable elements;

for each one of a remaining number of memory devices of the plurality of memory devices:

providing an authentication request to the memory device; and storing, in the memory device that provides the authentication request, an indication of an authentication status of the memory device to which the authentication request is provided, wherein the authentication status is based on whether or not the memory device that provides the authentication request receives a verified response from the memory device to which the authentication request is provided; and wherein the controller is configured to determine an authentication status of the plurality of memory devices based on the authentication statuses stored in the plurality of memory devices.

21. The apparatus of claim 20, wherein the apparatus comprises a host coupled to a memory module, wherein the plurality of memory devices are constituent memory dice of the memory module, and wherein the memory device to memory device authentication procedure is performed on the memory module without intervention from the host.

* * * * *